United States Patent
McCoy et al.

(10) Patent No.: US 6,613,179 B1
(45) Date of Patent: Sep. 2, 2003

(54) METHOD FOR PROVIDING ONSITE, ON-DEMAND EAR TAG PRINTING FOR LIVESTOCK OPERATIONS

(76) Inventors: William E. McCoy, P.O. Box 369, Temple, TX (US) 76503; William L. Nabors, P.O. Box 369, Temple, TX (US) 76503; Dennis Apana, P.O. Box 369, Temple, TX (US) 76503

( * ) Notice: Subject to any disclaimer, the term of this patent is extended or adjusted under 35 U.S.C. 154(b) by 0 days.

(21) Appl. No.: 09/883,115

(22) Filed: Jun. 15, 2001

(51) Int. Cl.$^7$ .................... B32B 35/00; B41M 3/00
(52) U.S. Cl. .................... 156/277; 156/387; 40/300
(58) Field of Search .................... 40/300, 301, 625, 40/626, 628, 630, 633, 638, 661.09; 156/272.2, 273.7, 277, 308.2, 379.8, 379.9, 387, 386, 583.1, DIG. 23; 283/74, 75, 79

(56) References Cited

U.S. PATENT DOCUMENTS

| | | | |
|---|---|---|---|
| 5,429,393 A | * | 7/1995 | Parlo .................... 283/108 |
| 5,635,012 A | * | 6/1997 | Belluci et al. .................... 156/277 |
| 6,409,872 B1 | * | 6/2002 | Campion et al. .................... 156/264 |

* cited by examiner

Primary Examiner—Richard Crispino
Assistant Examiner—Sing P. Chan
(74) Attorney, Agent, or Firm—David G. Henry

(57) ABSTRACT

A system and method for producing individually customizable identification tags for feed lot operations involving livestock. The method involves printing adhesive strips with indicia through use of computer-controlled printing devices, applying the strips to plastic tag blanks, and heat-stabilizing the strips as against wear and other pernicious environmental factors. The system allows on-site production of almost infinitely variable tag indicia, and eliminates time delays and inflexibility for operators in having to pre-order printed tags from distant tag producers.

6 Claims, No Drawings

METHOD FOR PROVIDING ONSITE, ON-DEMAND EAR TAG PRINTING FOR LIVESTOCK OPERATIONS

BACKGROUND OF THE INVENTION

1. Field of the Invention

Applicant's invention relates to methods for manufacturing ear tags for the cattle industry and similar applications.

2. Background Information

The United States Beef Industry annually markets approximately 24 million animals to supply both domestic and foreign demand for safe, high quality beef. These animals are fed in thousands of confinement feeding operations ("feed lots") scattered across the country. While many of these operations are small (less than 4000 head) a vast majority (over 75%) of cattle sold pass through larger commercial operations (over 4000 head).

These larger facilities are characterized by multiple owners of the cattle throughout the feed lot(s), which mixture creates a need for identification of cattle, or groups of cattle, in a quick and easily distinguished manner. The plastic ear-tag industry arose to meet such needs.

Historically, cattle groups have been rather simply distinguished either by color-coding with ear-tags or more commonly by hot-stamping pen or lot numbers on an ear-tag prior to attaching the tag to an animal. The hot-stamp machines are typically provided by the tag manufacturer to the feed lot for use on-site.

Quality initiatives and more focused management within the Beef Industry have led to the practice of individually identifying animals, even within ownership groupings. To meet this trend, tag manufactures have, at their factories, been sequentially numbering ear tags with hot-stamping machines for their customers. This practice has witnessed exponential growth since the early 1990's. Continued growth in this field is forecast and is an almost certainty as Beef producers continue to seek improvement in animal performance, genetic makeup of their herds, source verification, and management of their business. While striving for these objectives, producers must provide the public with assurance as to the safety and quality of their end product. This necessitates user friendly, economical, humane and visible identification. The sequentially numbered ear-tag adequately fills this role.

Existing, available sequential ear tag numbering machines are large, complex and expensive, all of which attributes have precluded their use "in the field". Therefore, feed lots currently rely on custom printing of their sequential tags. This causes extra management and costs due to customization, ordering, lead times, and inventory management. There exists a long felt, but unsatisfied need to be able to produce custom ear tags at the feed lot and dispense with the need for pre-made ear-tags.

SUMMARY OF THE INVENTION

It is an object of the invention to provide an improved business method for supplying printed plastic ear tags for livestock identification and management to end users.

It is another object of the present invention to provide a method for producing on-site, on-demand, individually customized plastic identification tags, principally for use by livestock management facilities.

It is another object of the present invention to provide a system and related method for producing plastic identification tags for use in livestock management.

It is another object of the present invention to provide a system and related method for producing plastic identification tags for use in livestock management, which system, by providing on-site, on-demand production of customizable tags, eliminates lead time in acquiring tags needed for livestock identification operations.

It is another object of the present invention to provide a system and related method for producing plastic identification tags for use in livestock management, which system, by providing on-site, on-demand production of customizable tags, substantially eliminates waste caused by over-ordering of factory-produced tags, as well as shortages caused by under-ordering.

It is another object of the present invention to provide a system and related method for producing plastic identification tags for use in livestock management, which system, by providing on-site, on-demand production of customizable tags, produced through use of software capable of generating essentially unlimited combinations of alpha-numeric and graphical indicia, allows for users to easily customize information, as well as depict multiple, variable information fields on any given identification tag.

It is another object of the present invention to provide a system and related method for producing plastic identification tags for use in livestock management, which system, by providing on-site, on-demand production of customizable tags, substantially reduces costs to end-users of obtaining customized, individually variable ear tags for livestock management purposes.

In satisfaction of these and related objectives, Applicant's present invention provides a method for providing end-users with, and with the ability to produce, customized, individually variable plastic tags for use in livestock management operations. The present method eliminates the need for factory production of customized ear tags (with the inherently required order lead time), reduces the likelihood of waste through over-ordering and the inconvenience of shortages, and provides near infinite flexibility in selecting the indicia which will appear on any given ear tag or batch of ear tags. The present method will provide end-users with greater flexibility, more useful end products, all at potential cost savings through resulting efficiencies.

Despite the obvious impetus for providing some method by which individually customized ear tags may be produced on-site and on-demand at feed lot operations, the solution (as provided by the method of the present invention) has not been obvious and is nowhere to be found in the livestock industry.

For the first time, the present inventors have assembled the necessary components and methodology to permit on-site, on-demand production of large or small numbers of identification tags for cattle, each one of which can be individually customized within the limits of the computer software that controls that which is printed on the tag (sequential numbers, bar codes, owner logos, distinguishing routing information, dates of arrival or intended departure, veterinary information, and so on).

Little of the individual components of the present system and methods are new, but the assemblage of elements and the methods of business which are achievable through their collective use represent highly beneficial, long-needed solutions to old and growing problems.

DETAILED DESCRIPTION OF THE PREFERRED EMBODIMENT

The system of the present invention, at its most basic level, involves a indicia printing stage, application of indicia to tag blank stage, and a image stabilization stage.

With respect to generating the indicia which will appear on a completed identification tag (such as that indicating livestock ownership, intended routing or processing, source verification, health status, and even quarantine status in some cases), the present systems and methods represent a departure from the conventional hot stamp image deposition processes of the existing cattle ear tag industry, whereby heated, metallic image blocks (having letters, numbers, or other characters in relief thereon) are pressed onto tag blanks with intervening colored film to deeply impress a colored image onto the blank. This conventional method is largely inflexible in terms of indicia which is printed, all but eliminates other than factory-based production (the opposite of on-site, on-demand), involves somewhat dangerous production equipment, and requires considerable lead time in acquiring needed supplies of custom-printed tags.

The primary method by which identification tags are produced within the scope of the present invention involves producing tags through use of lamination films on an interior, adhesion face of which is printed (in reverse) the desired indicia for a completed tag, rather than printing the indicia directly on the tag blanks themselves as will be described below.

The indicia is printed in reverse on the lamination film such that, when the film is applied to tag blanks, the indicia appears correctly to viewers who will view the indicia from and through the outer, non-adhesion surface of the lamination films on the finished tag. Examples of such lamination films are those available from the Avery-Dennison company of Ohio. Printing the indicia in this manner may involve either fluid jet printing as described below, or may involve the use of a chemical or thermal reaction-based "printing" of the image on the film as is an intended feature of the film itself.

Once a segment of lamination film is "printed" according to the appropriate method, it is applied to tag blanks and adhered to the tag blank in the hereafter described "welding" process, or as is prescribed by the manufacturer.

An alternative method for creating the indicia for a completed identification tag under the present invention is based upon ink jet printing technology (or similar, graphically unrestricted ink/paint deposition technology [hereafter sometimes referred to collectively as "fluid jet" technology]) with a specially adapted printer for, as needed, holding individual tags for printing, or with feeding magazine and conveyor mechanisms for automatically generating sequential tags without user loading and unloading of the tags. No specific example of such a modified printer is shown in this specification, nor need one be. It is well within the ability of anyone skilled in the design of media conveyance in the context of computer printers to construct or adapt a media carriage apparatus for carrying plastic ear tag blanks to the proper position in/near an ink jet computer printer for printing, holding the tag in the proper position during printing, and thereafter carrying the printed tag away to, for example, a collection bin. Thereafter, the process is repeated for successive tags which are "loaded" into such an apparatus.

While the use of ink jet type printing provides complete flexibility in selecting and arranging to-be-printed images (through use of the software to be described below), it does not, immediately upon printing, provide as durable an image as that provided by conventional hot stamp processes as mentioned above. Ink jet or paint jet images will simply wear off after a time through mechanical abrasion and/or exposure to water, UV, or chemicals. Accordingly, the present method also provides for "welding" the printed images through use of a laminating process.

A lamination or "welding" process which is equally useful in securing a fluid jet printed image which is applied directly to a tag blank, or to securing printed lamination film into a tag blank, involves a heat press process. For "welding" a fluid jet printed image onto a plastic tag blank, one first places a segment of polyester film (72 gauge/19 microns for the preferred mode of the present process) over the printed image. As applicable, the polyester film (or printed lamination film) is, in the preferred mode of the present process, in the form of an elongate strip which will pass linearly through a processing machine as sequential tags are processed and serves as a carrier to move processed tags from the machine to a collecting bin.

To the juxtaposed polyester film (or printed lamination film) and printed plastic tag blank is pressed a heated platen. The preferred mode of the present process involves using an aluminum platen which is coated with a 0.125 thick, 60 durometer silicone coating. The coated platen is to be heated to between 350° F. and 400° F. and pressed against the film/tag pairing using approximately 20 pounds of pressure.

The present inventors have discovered that the described "welding" process melts a small amount of a plastic tag's polyurethane material. This small portion of polyurethane (trapped by the overlying polyester or printed lamination film) disperses over the surface of the tag, including, as applicable, that portion with the ink jet-printed image. After heat and pressure is removed, this dispersed polyurethane solidifies as a substantially impermeable coating over the printed image, thereby rendering the image virtually as durable as the plastic tag member itself. In cases of using the printed lamination film, the durable image with appropriate carrier material is likewise "welded" to the tag blank.

The indicia which is generated in the production of plastic ear tags as prescribed by the present system and methods (whether printed on lamination film, or directly onto plastic tag blanks) is controlled by software, any number of examples of which are readily available in the marketplace.

The preferred software for use with the present method is software which allows on-screen formatting of alphanumeric characters and graphical images within a user-definable print media area. The print media area can be made to correspond to the dimensions of the to-be-printed space on plastic ear tag blanks which are to be processed with the present system.

Preferably, the software used will also include features for automatically generating a succession of numbers and/or letters (a "counter feature") which may be activated in a user-defined field within the print media area, such that the number and/or letter combination of each succeeded tag within a group of printed tags will automatically advance according to user-defined parameters and will be printed as such onto the respective tag blanks. The software should, as used in a preferred mode of the present method, include the capability of generating bar codes which correspond to information which is either elsewhere printed on the tag blanks in human perceptible form, or to off-tag information which is separately imported data which is accessed by the software.

Furthermore, an ideal software package for the present method would be one which permits a user to import digital representations of graphical images (such as logos) into the print media area through use of optical scanners which are ported to the software, or by simply loading graphical files (.jpg, .bmp., .mix, etc.) from disks or similar media. Of course, any reasonably user-friendly software will, as most analogous packages do have an on-screen representation of the to-be-printed end product (a plastic ear tag for present purposes).

Just as software for printing documents, greeting cards, prescription labels, and so on, include the appropriate line advance codes to correspond to the size of the to-be-printed media, so to will the software for the present system include the necessary control features for limiting printing within desired bounds on any single tag blank, and appropriately advancing the media carriage mechanism to bring the next to-be-printed tag bank into position for printing.

The preferred mode of the present methods and systems will, as cost considerations dictate, automate so much of the steps as possible. This may include, in some embodiments of the present system, apparatus for carrying printed tags directly from the printer to a hot stamp lamination press which employs the "welding" method described above. Of course, cost considerations may dictate that a simple, manual-feed device for laminating the printed tags be used. Clearly, a machine would be easily constructed which includes an orifice through which a tag blank and printed lamination film combination (or fluid jet-printed tag) is inserted with actuation mechanisms which, upon such insertion, actuate apparatuses within the machine which apply (as applicable) the prescribed polyester film, as well as effect the heat and pressure needed for "welding" the finished product.

The present system and related business method are expected to revolutionize the feed lot industry as relates to the use of plastic ear tag for cattle identification. No more need feed lot operators buy more tags, nor risk buying fewer tags, than they need in any given instance. No more need operators limit themselves to a single identification scheme on individual ear tags because of the very high relative costs of multiple, variable information fields thereon, when produced through conventional means. No more need operators try to prognosticate their needs days and weeks in advance, particularly for customized tag information. When feed lot operators adopt the business method and associated systems of the present invention, ear tag manufacturers will evolve into suppliers, primarily of ear tag blanks, not of printed tags which are ready for use.

The present method and system will reduce waste and allow for immediate correction of errors in tag information, or for updating information as changes occur (such as in livestock ownership, intended routing or processing, health status, and even quarantine status in some cases).

Although the invention has been described with reference to certain specific characteristics or features of preferred embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. A method for providing on-site, on-demand production of individually customized identification tags at livestock facilities comprising the steps of:

selecting a plurality of tag blanks as substrates for production of said identification tags;

selecting tab lamination material having an adhesion side and an opposite, non-adhesion side, said adhesion side being configured for producing indicia, visible from said non-adhesion side, upon processing by a lamination material printing apparatus, said tag lamination material being sized and shaped for application to said tag blanks;

selecting a lamination material printer apparatus for effecting said producing of indicia on said lamination material, said lamination material printer apparatus being operably interfaced with a computer with software executable on said computer, said software for controlling printing by said lamination printer apparatus onto said adhesion side of said lamination material, said lamination printer apparatus having a film positioning apparatus for positioning said lamination material into position relative to said lamination printer apparatus for a printing apparatus of said lamination printer apparatus to apply printed images onto said lamination material, said printed images being controlled by said software;

selecting a lamination material application apparatus configured for durably applying said lamination material to one or more said tag blanks after producing indicia thereon through operation of said lamination printer apparatus;

situating said tag blanks, said lamination material, said lamination printer apparatus, said computer with said software installed thereon, and said tab lamination apparatus at a livestock facility; and training personnel of said livestock facility to produce said identification tags through use of said lamination material, said lamination printer apparatus, said computer with said software installed thereon, and said tab lamination apparatus.

2. The method of claim 1 wherein said software includes user-actuatable features for selecting variable indicia for printing onto said lamination material.

3. The method of claim 1 wherein said software includes printer control features, customized via a graphical user interface, for selecting and arranging indicia which said lamination printer apparatus will, upon actuation by said computer, print onto a said lamination material which is positioned for printing by said film positioning apparatus.

4. A method for providing on-site, on-demand production of individually customized identification tags at livestock facilities comprising the steps of:

selecting a fluid jet printer apparatus and an operably interfaced computer with software executable on said computer, said software for controlling printing by said fluid jet printer onto print media, said fluid jet printer having a tag positioning apparatus for positioning a first tag blank into position relative to said fluid jet printer for a printing apparatus of said fluid jet printer to apply printed images onto said tag blank, said printed images being controlled by said software;

selecting a tab lamination apparatus for applying a protective, substantially transparent barrier atop a printed image on a said tag blank for protecting said printed image from abrasion or chemical alteration;

situating said fluid jet printer apparatus, said computer with said software installed thereon, and said tab lamination apparatus at a livestock facility; and situating a plurality of said tag blanks at said livestock facility for printing by an end user.

5. The method of claim 4 wherein said software includes user-actuatable features for selecting variable indicia for printing onto said tag blanks.

6. The method of claim 4 wherein said software includes printer control features, customized via a graphical user interface, for selecting and arranging indicia which said fluid jet printer will, upon actuation by said computer, print onto a said tag blank which is positioned for printing by said tag positioning apparatus.

* * * * *